(No Model.)

E. TANNEWITZ.
VEHICLE WHEEL.

No. 444,410. Patented Jan. 6, 1891.

Witnesses.
Geo. H. White
H. Cliff

Inventor
Edward Tannewitz
BY Ithiel J. Cilley
Attorney.

UNITED STATES PATENT OFFICE.

EDWARD TANNEWITZ, OF GRAND RAPIDS, MICHIGAN.

VEHICLE-WHEEL.

SPECIFICATION forming part of Letters Patent No. 444,410, dated January 6, 1891.

Application filed June 23, 1890. Serial No. 356,483. (No model.)

*To all whom it may concern:*

Be it known that I, EDWARD TANNEWITZ, a citizen of the United States, residing at Grand Rapids, in the county of Kent and State of Michigan, have invented a new and useful Improvement in Vehicle-Wheels, of which the following is a specification.

My invention relates to improvements in wheelbarrow, bicycle, and other light-vehicle wheels, and its objects are, first, to facilitate the inserting and securing of spokes in a vehicle-wheel where wire spokes are used; second, to facilitate the placing of an equal strain or tension upon each spoke in a wheel; third, to facilitate the securing of the spokes firmly into the hub of a wheel, and, fourth, to provide a means whereby a broken spoke may be removed from a wheel and be replaced by a new one. I attain these results by the mechanism illustrated in the accompanying drawings, in which—

Figure 1:
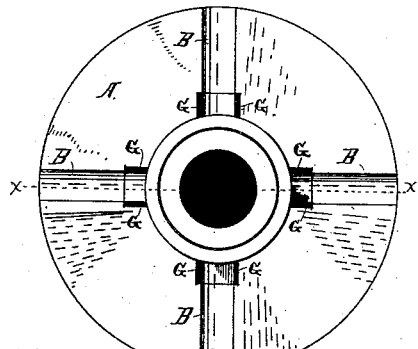
Figure 2:
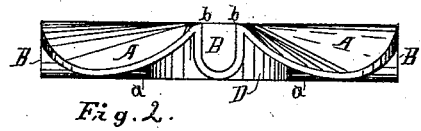
Figure 3:
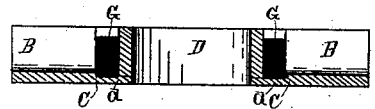
Figure 4:
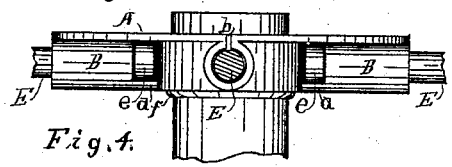
Figure 5:
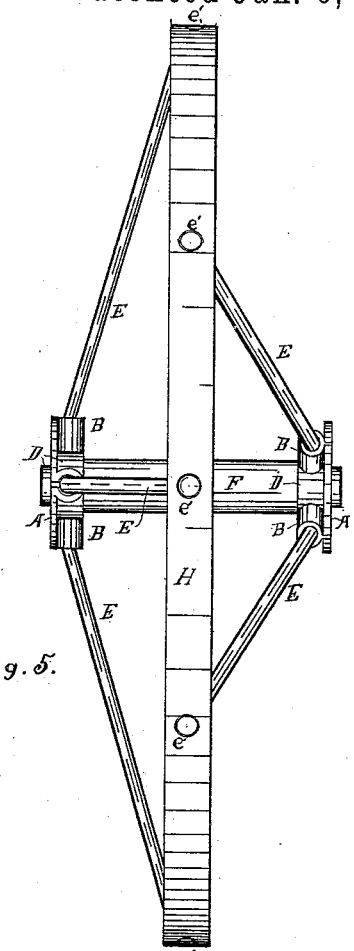
Figure 6:
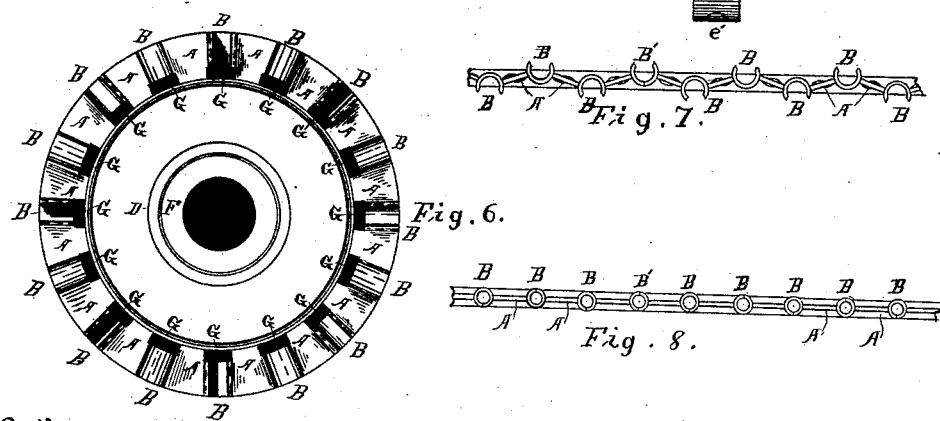
Figure 7:
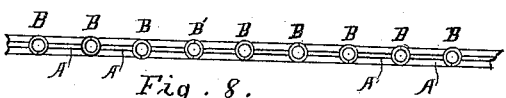
Figure 8:
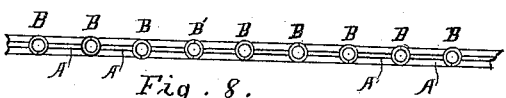

Figure 1 is a plan of a hub for use upon wheelbarrow-wheels. Fig. 2 is an edge view of the same. Fig. 3 is a cross-section of the same on the line $x\,x$ of Fig. 1. Fig. 4 is an edge view of the same with the web thrown to place for securing the spokes. Fig. 5 is an elevation of a wheel. Fig. 6 is a plan of a hub for use upon bicycles. Fig. 7 shows an extended view of the periphery of the same with the web in position to receive the spokes, and Fig. 8 shows the web thrown to position for securing the spokes in the hubs.

Similar letters refer to similar parts throughout the several views.

A is the web or flange of the hub.

B B, &c., are receptacles for the ends of the spokes.

C C, &c., are shoulders for supporting the strain upon the spokes.

D is the hub.

E E, &c., are the spokes.

F is the support or skein to which the hubs are secured.

G G, &c., are openings in the flange to facilitate the throwing of the web to place for securing the spokes, and H is the rim or tire of the wheel.

In constructing my hubs for use upon wheelbarrow and other wheels requiring but a few spokes I place the spoke-receptacles B B all upon one face of the web and depress the web between them so that the openings will be large enough to receive the ends of the spokes. Upon these hubs I connect the web with the receptacles at the extreme open end of the walls, so that when the web is straightened, as in Figs. 4 and 5, the points of the receptacles will be closed together and the spoke held securely in place. To facilitate the bending of the walls of the receptacle around the spokes, I cut the back ends of the walls away, so as to form apertures G G, &c., between them and the hub proper, leaving a narrow neck $d$ at the lower side to support the back of the receptacle and have the web connected with the hub between the receptacles to support them at the face sides.

To secure the spokes into the hubs I form heads $e\,e$, &c., upon the inner ends of the spokes and a corresponding shoulder G G upon the inner ends of the receptacles, so that when the spokes are in place and the web of the hub is thrown to the position shown in Figs. 4, 5, and 8 it will be impossible to draw the spokes out.

I secure the spokes in the rim or tire of the wheel by means of countersunk or rivet heads resting in countersunk openings, as at $e'$, and this may be done either by riveting the spokes after they are inserted into the wheel or by making the openings in the tire large enough so that the heads $e$ on the inner ends of the spokes will pass through, and forming the heads upon both ends of the spokes before they are inserted; but I prefer the latter mode, as I can thereby make my spokes of a uniform length, while by the former plan the riveting of the spokes after they are in the wheel is likely to vary their length, and thus produce an untrue rim upon the wheel. To construct a wheel upon these hubs insert one set or side of spokes through the tire or rim H, place the inner ends into the receptacles B B, &c, in the hub, and secure them by straightening the web. Then place the hub upon one end of the hollow shaft or skein F and a corresponding hub upon the opposite end (there being shoulders $f'$ upon the skein to prevent the hubs from drawing together) and insert the opposite set or side of the spokes through the tire, and spring the tire over sufficiently to allow the inner ends of the spokes to enter the receptacles of the second flange of the hub, and secure them to place by straightening the rim or web of this flange. Pains should be taken when forming the spokes to make them a proper length, so that when the tire is in proper position there will be sufficient tension or strain upon them to render the wheel rigid and firm. The hole $t$ through the center of the skein should be of a proper size to receive the end of the axle-tree in the usual manner.

When constructing hubs for a wheel requiring a large number of spokes, I dispense with the neck or support $d$ and support the receptacles upon the intervening webs and arrange them to open alternately upon one side and the other, as shown in Figs. 6, 7, and 8, and twist the web so that it will form a serpentine line, as shown in Fig. 7, and after I have placed the ends of the spokes into the receptacles I straighten the web and close the receptacles around the spokes, as indicated in Fig. 8. These receptacles may be made to open upon one side only, as at B B, or upon both sides, as at B′, though I prefer the former, as I have thereby a continuous web, and consequently a much stronger hub than with the latter. To remove a spoke from this hub, open the receptacle by bending the web until the spoke can be removed and a new one inserted. These hubs may be made of malleable iron or any other ductile metal suitable for the purpose.

Having thus fully described my invention, what I claim as new, and desire to secure by Letters Patent of the United States, is—

1. As a new and useful article of manufacture, a wheel having a hollow skein provided with hubs, and hubs provided with receptacles having an opening on one side, arranged to be closed around the end of the spoke by straightening the rim, substantially as and for the purpose set forth.

2. The combination, in a vehicle-wheel, of a hub having a serpentine rim and receptacles for the spokes, with openings in one side, shoulders at the back ends, apertures through the back ends to facilitate bending them to place, spokes having heads at one end to engage with the shoulders on the receptacles, and countersunk heads at the opposite ends to engage with the tire, a tire and a hollow mandrel, substantially as and for the purpose set forth.

3. The combination, in a vehicle-wheel, of a tire, spokes secured in the tire and provided with heads to engage with the receptacles having openings on one side, shoulders at the back ends of the receptacles and a web between the receptacles so arranged that by throwing them up in a straight line the receptacles will be closed and the spokes secured firmly, and a hollow skein or shaft provided with shoulders, substantially as and for the purpose set forth.

4. The combination, in a vehicle-wheel, of a tire, spokes secured at one end to the tire, and the other ends provided with heads to engage with the hubs, hubs provided with receptacles arranged with openings on alternate sides, and shoulders formed by apertures through the back ends, a web set serpentine for opening the receptacles, and so set that the straightening of the web will close the receptacles and secure the ends of the spokes, and a hollow skein, substantially as and for the purpose set forth.

5. A hub for a vehicle-wheel, having open receptacles for the spokes of the wheel, an opening at the back ends of the receptacles, forming shoulders, and the receptacles connected by a crooked rim, the straightening of which will close the receptacles around the spokes, substantially as specified.

EDWARD TANNEWITZ.

In presence of—
GEORGE H. WHITE,
ITHIEL J. CILLEY.